United States Patent
Macha et al.

(10) Patent No.: US 11,353,838 B2
(45) Date of Patent: *Jun. 7, 2022

(54) DISTRIBUTED COMPUTING IN A PROCESS CONTROL ENVIRONMENT

(71) Applicant: Schneider Electric Systems USA, Inc., Foxboro, MA (US)

(72) Inventors: Raja Ramana Macha, Trabuco Canyon, CA (US); Andrew Lee David Kling, Salem, MA (US); Nestor Jesus Camino, Jr., Hingham, MA (US); James Gerard Luth, Foxboro, MA (US); Richard Linwood Linscott, Plainville, MA (US)

(73) Assignee: Schneider Electric Systems USA, Inc., Foxboro, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/141,344

(22) Filed: Jan. 5, 2021

(65) Prior Publication Data

US 2021/0124325 A1 Apr. 29, 2021

Related U.S. Application Data

(63) Continuation of application No. 16/549,264, filed on Aug. 23, 2019, now Pat. No. 10,908,574, which is a (Continued)

(51) Int. Cl.
*G05B 9/02* (2006.01)
*G05B 19/042* (2006.01)
*G05B 9/03* (2006.01)
*G05B 19/418* (2006.01)
(Continued)

(52) U.S. Cl.
CPC ............ *G05B 19/042* (2013.01); *G05B 9/03* (2013.01); *G05B 19/4185* (2013.01);
(Continued)

(58) Field of Classification Search
CPC .... G05B 19/042; G05B 9/03; G05B 19/4185; G05B 2219/24175; G05B 2219/31168; G05B 2219/33273; G05B 19/41855; G05B 2219/31112; G05B 2219/31253; G06F 9/5055; G06F 11/16; G06F 11/2035;
(Continued)

(56) References Cited

U.S. PATENT DOCUMENTS 6,415,418 B1 * 7/2002 McLaughlin ............ G05B 9/03
714/E11.08
2003/0153988 A1 * 8/2003 Shepard ............... G05B 19/042
700/19
(Continued)

*Primary Examiner* — Zhipeng Wang
(74) *Attorney, Agent, or Firm* — Stinson LLP

(57) ABSTRACT

High availability and data migration in a distributed process control computing environment. Allocation algorithms distribute data and applications among available compute nodes, such as controllers in a process control system. In the process control system, an input/output device, such as a fieldbus module, can be used by any controller. Databases store critical execution information for immediate takeover by a backup compute element. The compute nodes are configured to execute algorithms for mitigating dead time in the distributed computing environment.

20 Claims, 12 Drawing Sheets

Related U.S. Application Data continuation of application No. 14/697,866, filed on Apr. 28, 2015, now Pat. No. 10,437,212.

(51) Int. Cl.
  *G06F 9/50* (2006.01)
  *G06F 11/16* (2006.01)

(52) U.S. Cl.
  CPC ............ *G06F 9/5055* (2013.01); *G06F 11/16* (2013.01); *G05B 2219/24175* (2013.01); *G05B 2219/31168* (2013.01); *G05B 2219/33273* (2013.01); *Y02P 90/02* (2015.11)

(58) Field of Classification Search
  CPC ............... G06F 11/1641; G06F 11/184; G06F 11/2038; G06F 2201/80; G06F 11/2025; G06F 11/2046; Y02P 90/02
  See application file for complete search history.

(56) References Cited

U.S. PATENT DOCUMENTS

| | | | |
|---|---|---|---|
| 2010/0037089 A1* | 2/2010 | Krishnan | G06F 11/2046 714/5.11 |
| 2011/0265084 A1 | 10/2011 | Knowles et al. | |
| 2013/0031342 A1* | 1/2013 | French | G06F 9/06 713/2 |
| 2013/0227335 A1 | 8/2013 | Dake et al. | |
| 2013/0339981 A1* | 12/2013 | Ishibashi | G06F 11/203 719/312 |
| 2014/0310435 A1* | 10/2014 | Gosh | G06F 3/061 710/74 |
| 2016/0085647 A1* | 3/2016 | Ramasubramaniam | G06F 11/2028 714/4.12 |

* cited by examiner

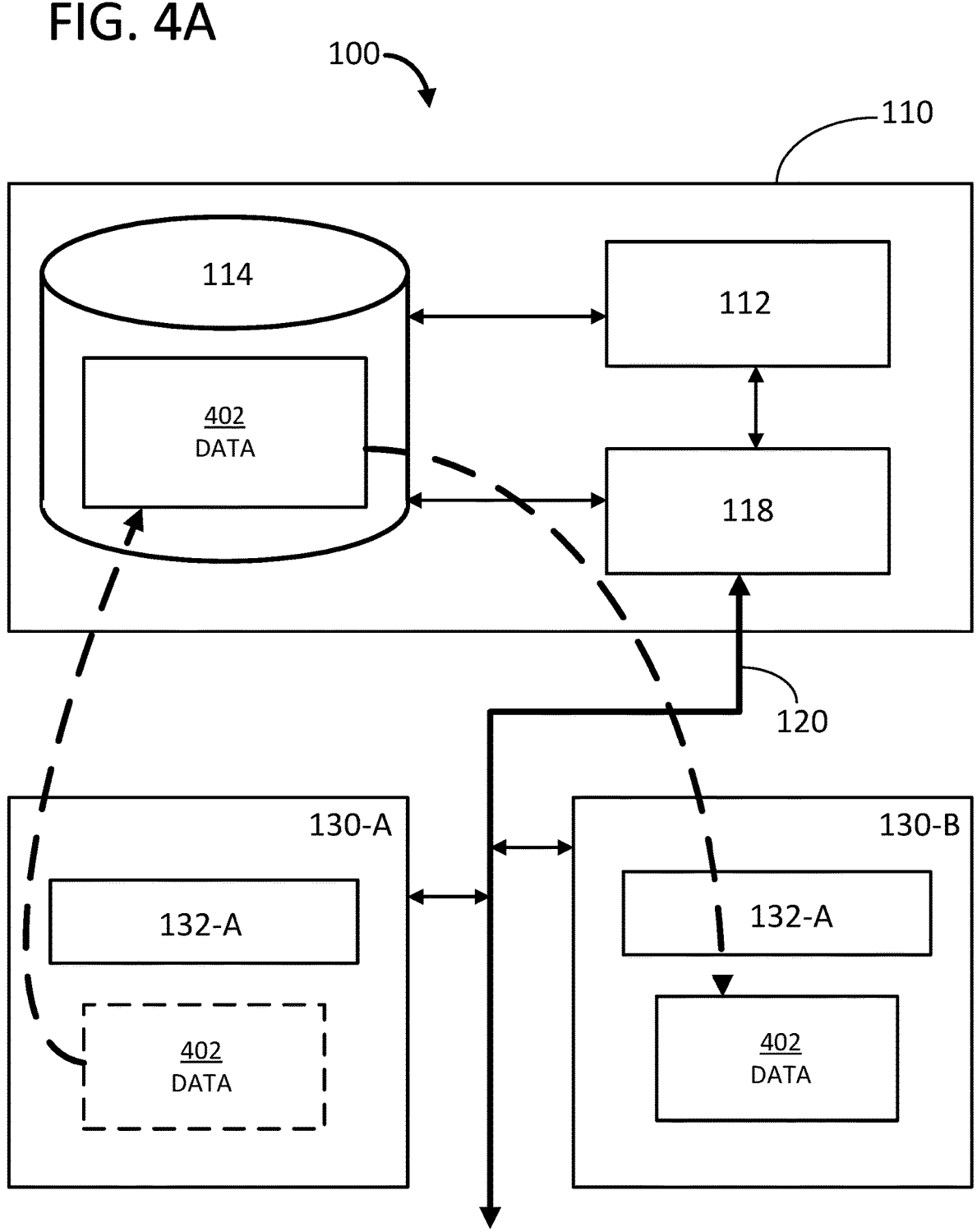

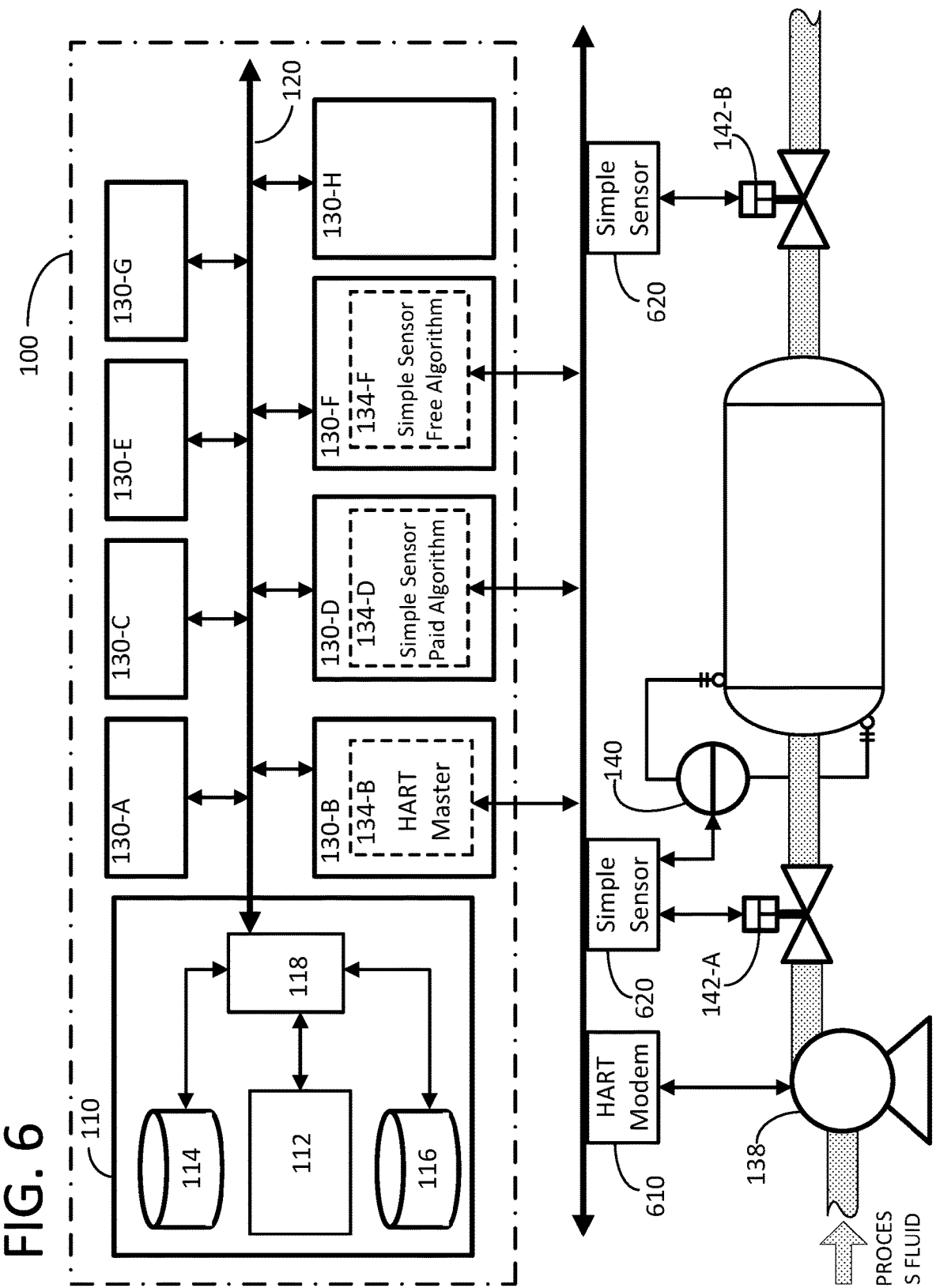

DISTRIBUTED COMPUTING IN A PROCESS CONTROL ENVIRONMENT

CROSS-REFERENCE TO RELATED APPLICATION

This application is a continuation of U.S. application Ser. No. 16/549,264, filed Aug. 23, 2019, which is a continuation of U.S. application Ser. No. 14/697,866, filed Apr. 28, 2015, now U.S. Pat. No. 10,437,212, the entire disclosures of which are incorporated herein by reference.

BACKGROUND

Process control devices monitor and physically modify operating conditions within a dynamic system or process. Redundancy and increased stability are provided in process control implementations through the use of backup components. In conventional process control implementations, a backup component must be an exact duplicate of its corresponding primary component to provide acceptable redundancy without interruption. This one-to-one redundancy relationship between primary and backup components presents various problems in the field of process control. For example, it increases the cost of the process control system because every primary component requires a backup component. Applications written on these one-to-one redundancies may need to be written specifically to execute on the redundant platform to fully support the redundancy scheme. Further, the one-to-one redundancy relationship may result in nonuse of backup components when their corresponding primary components are operating normally. Increasing the amount of available process control system resources also requires adding both additional primary components and corresponding backup components, which results in increased cost and complexity. Moreover, altering the configuration of control system components in conventional implementations requires laborious rewiring of component connections. In other words, these conventional systems are rigid and unable to adapt to changing system demands.

SUMMARY

Aspects of the present invention overcome the limitations of the prior art and improve the field of process control and automation through reducing the required amount of redundant hardware and through new algorithmic approaches. An additional benefit is provided by reducing the amount of time and cost associated with reconfiguring components to satisfy changing system demands. In an aspect of the invention, a distributed computing environment is provided such that an I/O device can be used by all controllers within the distributed computing environment. Also, aspects of the invention utilize allocation algorithms to distribute data and applications among available compute nodes using databases to store critical execution information for immediate takeover by an alternate compute node. Preferably, different algorithms are implemented that can mitigate the impact of dead time in a distributed computing environment.

In an aspect, a system for providing process control includes a communication channel and a plurality of compute nodes each connected to the communication channel. The system further includes one or more executive nodes providing a set of executive services connected to the communication channel. The compute nodes and the executive services comprise a distributed computing environment. These compute nodes may in some instances vary both the hardware and the type or version of operating system employed. However, they collaborate and may back up applications on one another even though they are dissimilar platforms. At least one of the compute nodes of the system also includes an input/output (I/O) application that provides an electronic datapath between a process control device and the communication channel.

In an additional aspect, an apparatus for controlling a process comprises an electronic data communication channel and a plurality of compute nodes each connected to the communication channel. At least one compute node implements a process control application. Moreover, the apparatus includes a sensor that is connected to the communication channel and provides electronic data representative of a physical value of the process and an actuator that is connected to the communication channel and receives electronic data representing a manipulation of a physical value of the process. The apparatus also includes an executive node that is connected to the communication channel and that initiates a transfer of at least a subset of the process control application among one or more other compute nodes via the communication channel.

In another aspect, a method for distributing data in a distributed process control environment includes transmitting, by a first compute node, one or more electronic datasets to a central data store. The datasets represent at least one of a current state, control data, and I/O data of one or more applications executing within the first compute node. Moreover, the method includes receiving, by a second compute node, at least one of the datasets from the central data store upon detection, by an executive services manager, of a loss of the first compute node. The method also includes executing, by the second compute node, one or more applications each corresponding to the applications of the first compute node. The applications of the second compute node transform the received at least one dataset into data representing a change to a process. The second compute node transmits the data representing the change to a process control device and the process control device manipulates the process according to the transmitted data.

A side benefit of an architecture embodying aspects of the invention is a reduction of engineering effort related to configuring the control applications. For example, the architecture allows I/O data to be shared with any controller thus eliminating much of the engineering coordination between the control application and the I/O modules. This overcomes routing all of the intermediate wiring of sensor signals through relay cabinets and marshalling cabinets, which is typically required to configure sensor I/O data points to I/O Modules and to controllers according to conventional architectures.

A long term benefit of an architecture embodying aspects of the invention is the simple evolution of the hardware. As the architecture works on dissimilar hardware, new hardware with current components can easily replace older, obsolete hardware.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF DRAWINGS

FIG. 4A is a diagram illustrating data migration and distribution of an exemplary architecture of hardware components in accordance with an embodiment of the invention.

FIG. 6 is a diagram of an exemplary architecture of hardware components utilizing heterogeneous input/output connections in accordance with an embodiment of the invention.

Corresponding reference characters indicate corresponding parts throughout the drawings.

DETAILED DESCRIPTION

Figure 1:
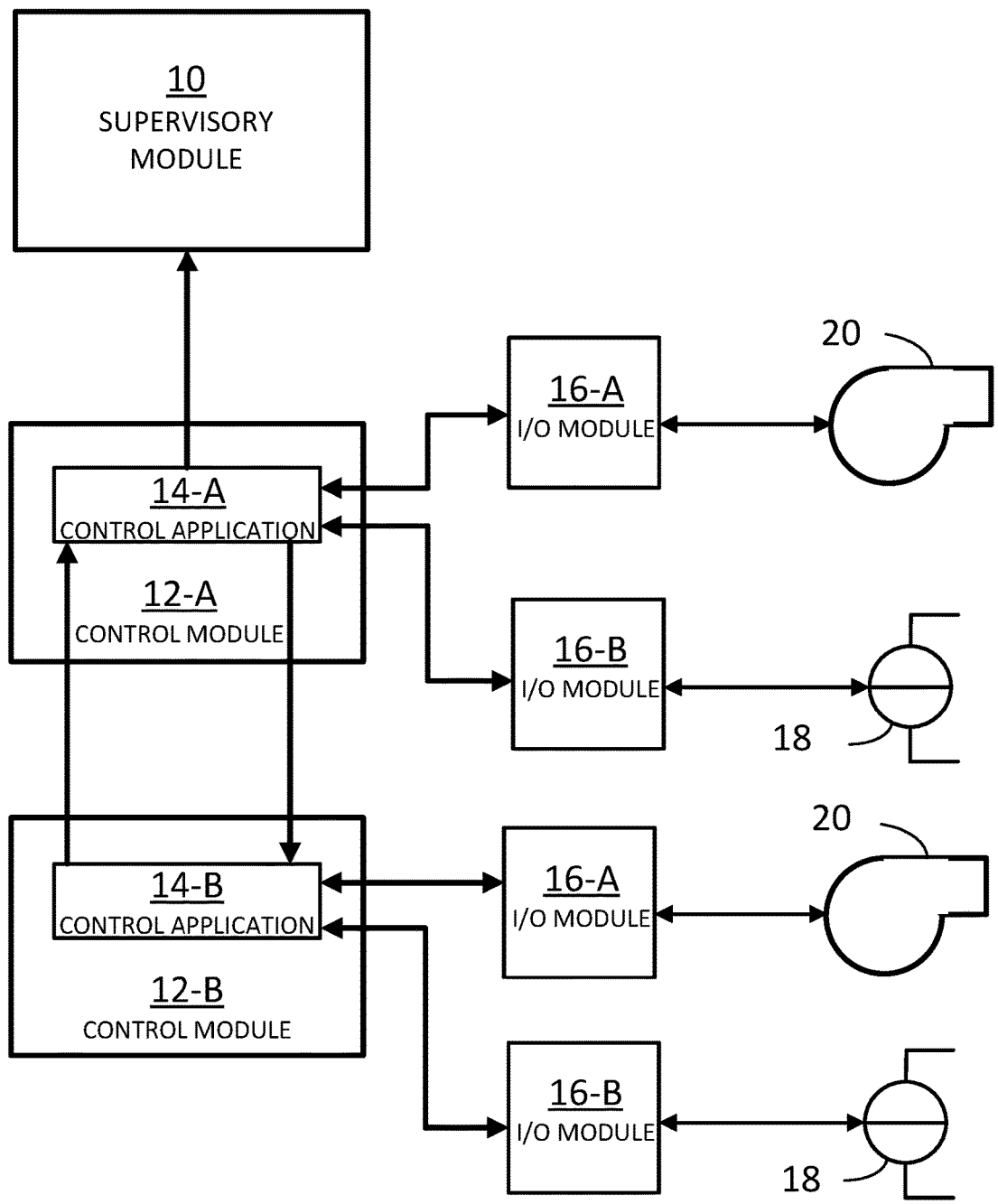
FIG. 1 is a diagram of cascaded control connections of the prior art.

FIG. 1 illustrates a conventional cascaded control loop. The cascaded control loop includes a supervisory module 10, control modules 12-A and 12-B, and input/output (I/O) modules 16-A and 16-B. The control modules 12-A and 12-B each include a control application, 14-A and 14-B, respectively. Control module 12-A is directly connected to the I/O modules 16-A and 16-B. Control module 12-A is also connected to control module 12-B such that a cascaded control loop is formed. The I/O module 16-A is connected to a sensor 18 and the I/O module 16-B is connected to a pump 20. In this manner, the sensor 18 and the pump 20 are dependent upon control module 12-A and control application 14-A because of the direct connections.

A significant drawback associated with the conventional cascaded control loop of FIG. 1 is the management of peer-to-peer subscriptions between applications. For example, when control module 12-A enters a failure state, the migration of the control application 14-A to a different control module requires all of the connections to be re-established as part of the migration. In other words, a failover mechanism would need to manually disconnect I/O modules 16-A and 16-B from control module 12-A and reconnect them to a different control module. There is a resulting negative impact on control if cascade loops or blocks within a loop are fragmented across multiple control modules according to this conventional implementation.

Another disadvantage of the conventional cascaded control loop of FIG. 1 is the dependency of control module 12-B and control application 14-B on control module 12-A and control application 14-A. For instance, when control module 12-A enters a failure state, supervisory module 10 no longer has a connection with control module 12-B or control application 14-B. In order to regain the connection, a failover mechanism would have to change the failed hardware of control module 12-A with a replacement or manually disconnect control module 12-B from control module 12-A and reconnect it to supervisory module 10.

Figure 2:
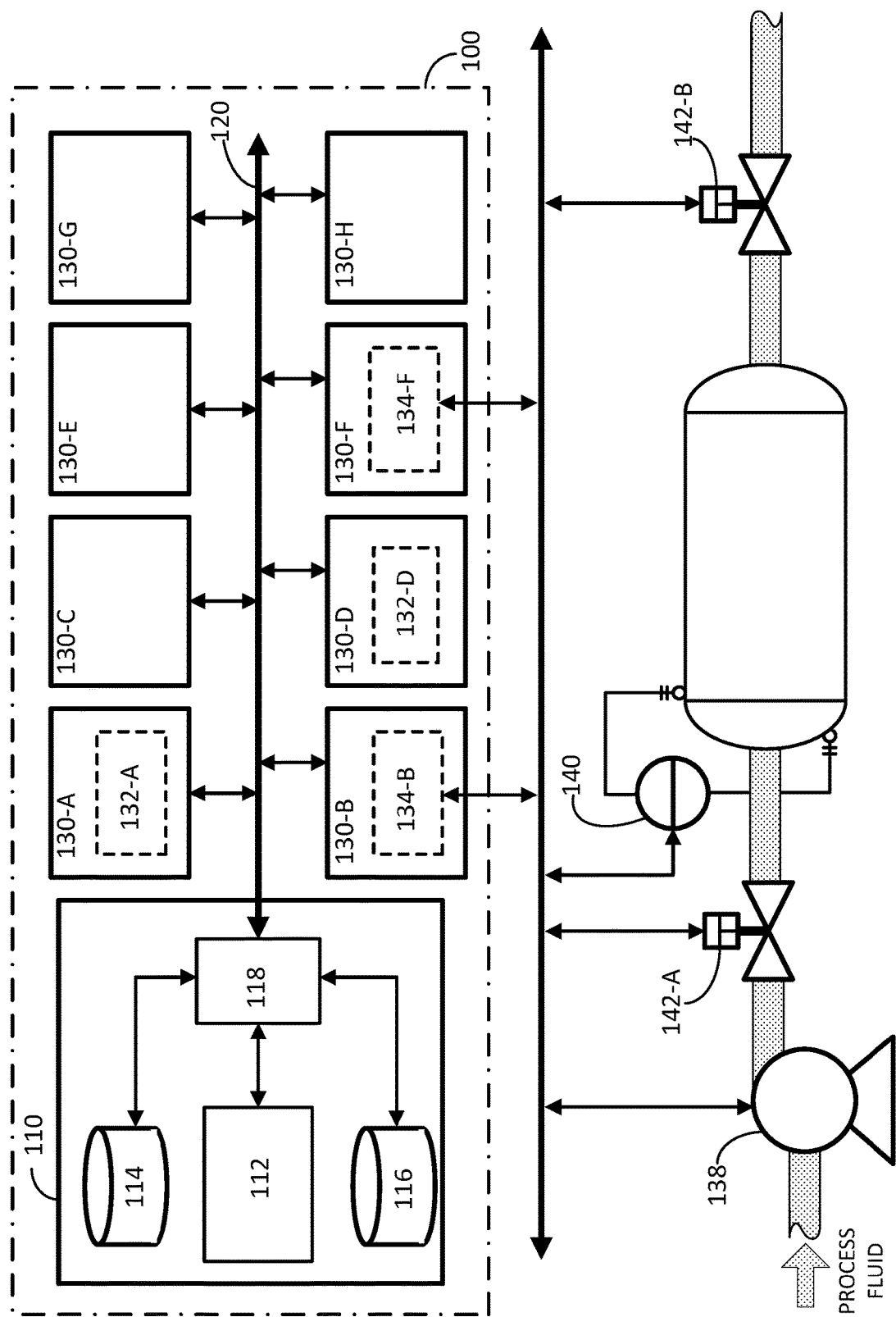
FIG. 2 is a diagram of an exemplary architecture of hardware components in accordance with an embodiment of the invention.

FIG. 2 illustrates a process control computing system 100 in accordance with an embodiment of the invention. In the illustrated embodiment, the process control computing system 100 is included within a process control environment for a fluid processing system that also includes a pump 138, a sensor 140, and valves 142. The process control computing system 100 includes an executive node 110, a communication channel 120, and a plurality of compute nodes 130. The executive node 110 includes an executive services manager 112, a control database 114, an input/output (I/O) database 116, and a communication interface 118. A control application 132-A is included in the compute node 130-A and a control application 132-D is included in compute node 130-D. An I/O application 134-B is included in compute node 130-B and an I/O application 134-F is included in compute node 130-F. In other exemplary embodiments, control applications 132 and/or I/O applications 134 are executed by a computational engine by a compute node 130, as further described herein. In another embodiment, system 100 is boundary-less with executive services manager 112 and databases (e.g., control database 114, I/O database 116, etc.) distributed among compute nodes 130. In an aspect, functionality for system 100 is provided through discrete applications, as further described herein, and not a monolithic image. In another aspect, system 100 is scalable. In yet another aspect, system 100 provides a central data store as a data distribution mechanism, which results in data being readily available to all nodes. In this aspect, the central data store includes a variety of data types including, but not limited to, data, objects, relationships, and the like for process control.

In process control computing system 100, compute nodes 130 are communicatively connected to communication interface 118 via communication channel 120. Through these communicative connections, control applications 132-A and 132-D communicate with control database 114 and I/O applications 134-B and 134-F communicate with I/O database 116. Executive services manager 112, control database 114, and I/O database 116 are communicatively connected to communication interface 118. However, in alternative embodiments, executive services manager 112, control database 114, and I/O database 116 are communicatively connected to communication channel 120. Executive services manager 112 communicates with compute nodes 130, control applications 132, and I/O applications 134 via communication interface 118 and communication channel 120. I/O applications 134-B and 134-F are communicatively connected to the pump 138, the sensor 140, and the valves 142. The communicative connections may include those that operate according to analog, digital, pulse, serial, and/or parallel techniques, such as the HART® communications protocol, for example. In addition, more than one communications protocol may be used simultaneously. For example, I/O application 134-B communicates using the HART® communications protocol, while I/O application 134-F communicates using the FOUNDATION Fieldbus communications protocol.

In an aspect, process control computing system 100 is adapted for distributing execution load among compute nodes 130. In one embodiment, process control computing system 100 is adapted to function as a single universal I/O module. The process control computing system 100 can accommodate the addition or removal of compute nodes 130. Advantageously, the architecture of process control computing system 100 supports load balancing and failover by migrating control among compute nodes 130. The granular control and ability to fragment control applications 132 and I/O applications 134 makes it possible to distribute control applications 132 and I/O applications 134 executing on failed compute nodes 130 among other compute nodes 130 with spare capacity. In an aspect, process control computing system 100 acts as a data store that allows for separation of networks (e.g., separate control and I/O networks).

In a further aspect, process control computing system 100 is adapted for controlling variables in processes that change or refine raw materials to create end products. Processes include, but are not limited to, those in the chemical, oil and gas, food and beverage, pharmaceutical, water treatment, and power industries. For example, process control computing system 100 controls factors such as the proportion of one ingredient to another, the temperature of materials, how well ingredients are mixed, and the pressure under which materials are held.

Referring further to FIG. 2, executive node 110 is adapted for providing shared data, data processing tasks, and other services or resources. In an embodiment, executive node 110 comprises a collection of services (e.g., executive services manager 112, control database 114, I/O database 116, etc.) provided by a single physical computing device or a plurality of physical computing devices (i.e., distributed executive services). In one aspect, executive node 110 supplies data and/or connection aggregation and federation capabilities. For example, executive node 110 aids the combining of data (i.e., aggregation) by storing I/O and control data provided by one or more compute nodes 130 through communication interface 118 and communication channel 120. As another example, executive node 110 facilitates transmission of data generated in one or more compute nodes 130 or control database 114 to another compute node 130 or control database 114 (i.e., federation) through communication interface 118 and communication channel 120. In one form, an entire set of aggregated data is federated out to compute nodes 130, and in another form, only a relevant subset of aggregated data is federated out to compute nodes 130.

In accordance with other aspects of the invention, executive node 110 of FIG. 2 monitors compute nodes 130 to determine a current state and/or a computational load. For instance, executive node 110 monitors compute node 130-A in order to determine if it is in a state that indicates an imminent failure. Moreover, executive node 110, according to aspects of the invention, is configured to monitor an amount of computational resources utilized by compute node 130-A. In yet another aspect, executive node 110 enables data migration when one of compute nodes 130 fails. For example, executive node 110 facilitates data migration from compute node 130-A to compute node 130-D when node 130-A is nearing or has entered a failure state, as further described below. Executive node 110 can also be configured to provide service management. In one exemplary embodiment, service management includes deploying applications, such as control applications 132 and I/O applications 134, to one or more compute nodes 130. In another exemplary embodiment, service management includes state management of applications, such as control applications 132 and I/O applications 134.

Referring again to FIG. 2, executive node 110 may be embodied as computer-executable instructions stored on a non-transitory computer-readable medium, such as a computer functioning as a server, an embedded device, or a single-board computer (e.g., Raspberry Pi), for example. However, it is to be understood by one skilled in the art that executive node 110 may also be embodied as digital or analog electronic circuitry. In another embodiment, executive node 110 is provided at a physical location that is remote from physical locations of compute nodes 130. In yet another embodiment, high availability of the functionality of executive node 110 is provided through the utilization of more than one executive node 110 and/or duplicate components that comprise executive node 110.

The executive services manager 112 of FIG. 2 is adapted for distributing control applications 132 and I/O applications 134 among compute nodes 130. This distribution may be accomplished by executive services manager 112 transmitting and receiving control signals via communication channel 120. The executive services manager 112 embodying aspects of the invention is configurable for detecting a failure or removal of one or more compute nodes 130. In another embodiment, executive services manager 112 is adapted for detecting added or recently activated compute nodes 130. In yet another embodiment, executive services manager 112 is adapted for activating queued control applications 132 and/or I/O applications 134 for execution by compute nodes 130. Beneficially, executive services manager 112 provides elasticity to process control computing system 100 and allows for the extension of heavily loaded systems without disrupting existing control. According to an exemplary embodiment, executive services manager 112 manages portions of process control computing system, which may be referred to as a cloud environment in some embodiments, for example.

The executive services manager 112 may be embodied as computer-executable instructions stored on a non-transitory computer-readable medium, such as a computer functioning as a server. In further embodiments, executive services manager 112 is embodied as digital or analog electronic circuitry. In one embodiment, executive services manager 112 is embodied as computer-executable instructions executing on an executive node 110. In another embodiment, executive services manager 112 is embodied as computer-executable instructions executing on a compute node 130. In yet another exemplary embodiment, executive services manager 112 is embodied as computer-executable instructions executing on multiple executive nodes 110 and/or compute nodes 130, as further described herein.

Referring again to FIG. 2, control database 114 is adapted for storing computer-readable control data on a non-transitory computer-readable medium. The computer-readable control data, including state information, represents, for example, a physical state of control applications 132 and/or process control devices, including field devices such as pump 138, sensor 140, and valve 142. Control database 114 is also adapted for making stored data available to compute nodes 130. In an aspect, control database 114 relieves the need to continuously publish all of the control data to every compute node 130. In another aspect, control database 114 is adapted as a data store that allows for separation of a control network comprised of control database 114 and control applications 132-A, 132-D from an I/O network comprised of I/O database 116 and I/O applications 134-B, 134-F.

Still referring to FIG. 2, I/O database 116 is adapted for storing computer-readable I/O data on a non-transitory computer-readable medium. In an embodiment, the computer-readable I/O data represents a physical state of I/O applications 134 and/or process control devices, including pump 138, sensor 140, and valve 142. I/O database 116 is also adapted for making stored I/O data available to compute nodes 130. According to one embodiment, I/O database 116 relieves the need to continuously publish all of the I/O data to every compute node 130. In an aspect, I/O database 116 is adapted as a data store that allows for separation of a control network comprised of I/O database 116 and I/O applications 134-B, 134-F from a control network comprised of control database 114 and control applications 132-A, 132-D.

The communication interface 118 is adapted for facilitating data communication between components that comprise executive node 110 and communication channel 120. In the embodiment illustrated by FIG. 2, communication interface 118 facilitates data communication between executive services manager 112, control database 114, I/O database 116, and communication channel 120. Communication interface 118 is a network interface card, for example.

The communication channel 120 of FIG. 2 is adapted for providing a communicative connection among executive node 110 and compute nodes 130. In an aspect, communication channel 120 is a common high-speed communications connection that is shared by all nodes of system 100 (e.g., compute nodes 130 and/or executive nodes 110). In one embodiment, communication channel 120 is a telecommunications network that facilitates the exchange of data, such as those that operate according to the IEEE 802.3 (e.g., Ethernet) and/or the IEEE 802.11 (e.g., Wi-Fi) protocols. In another embodiment, communication channel 120 is any medium that allows data to be physically transferred through serial or parallel communication channels (e.g., copper wire, optical fiber, computer bus, wireless communication channel, etc.).

With continued reference to the exemplary embodiment of FIG. 2, compute nodes 130 are adapted for executing control applications 132 and I/O applications 134. In one aspect, compute nodes 130 are connected via communication channel 120 and interact with each other to achieve a common objective. In another exemplary embodiment, compute nodes 130 are adapted for executing executive services manager 112, control database 114, I/O database 116, a compute services manager, and/or a computational engine, as further described herein. Compute nodes 130 may be comprised of low-cost off-the-shelf hardware, embedded controllers, and/or virtualized controllers. For example, in an exemplary embodiment, compute nodes 130 are embodied as computer-executable instructions stored on a non-transitory computer-readable medium, such as a computer, an embedded device, or a single-board computer (e.g., Raspberry Pi). However, it is to be understood by one skilled in the art that compute nodes 130 may also be embodied as digital or analog electronic circuitry. In an embodiment, compute nodes 130 are in close physical proximity to each other. In another embodiment, compute nodes 130 and communications involving compute nodes 130, such as communications via communication channel 120, are cyber secure. For example, cyber security is provided through the use of cryptography, blacklists, and the like.

The control applications 132 of FIG. 2 are adapted for monitoring and controlling variables of a process. In an exemplary embodiment, control application 132-A receives data from a measurement instrument (e.g., sensor 140) that represents a current physical state of a manufacturing process, compares the data to a pre-selected setpoint or other data, and transmits a signal to a control element (e.g., pump 138 and/or valve 142) to take corrective action. Control applications 132 in an embodiment of the invention perform mathematical functions to make comparisons among data or between data and a setpoint. It is to be understood by one of ordinary skill in the art that, in an embodiment, control applications 132 are comprised of a varying number of components. For example, the specific components used for executing a single control application 132 may include, but are not limited to, a simple executable program, a platform to support the control application, an execution framework, and/or a set of configuration data. In an embodiment, the execution framework consists of one or more of a variety of environments to support logic execution such as a Foundation Fieldbus FBAP, a Java Virtual Machine plus Java Applet, and/or a .NET run-time environment with the common language runtime (CLR). Control applications 132 have a range of functionality. In one embodiment, control applications 132 are control logic, such as compound-block execution or advanced control. In further embodiments, control applications 132 may include, but are not limited to, I/O function block processing, IEC1131-3 control processing (e.g., Function Block, Sequential Function Chart, Ladder Diagram, Instruction List, or Structured Text), supervisory control applications, simulation applications, safety applications, optimization applications, alarm and event processing, and the like. Moreover, in an additional embodiment, control applications 132 include mixing other types of applications, such as, but not limited to, a historian, operator interfaces, and/or reporting packages onto compute nodes 130. Control applications 132 may be embodied as computer-executable instructions stored on a non-transitory computer-readable medium, such as a programmable logic controller. In further embodiments, control applications 132 are embodied as digital or analog electronic circuitry. Advantageously, control applications 132 allow any compute node 130 to monitor and control process variables.

The I/O applications 134 of FIG. 2 are adapted for receiving and transmitting electrical signals between process control computing system 100 and process control elements (e.g., pump 138, sensor 140, and valve 142). Electrical signals transmitted and received by I/O applications 134 may be analog (e.g., 4-20 mA current signal) or digital (e.g., HART® protocol, FOUNDATION™ Fieldbus protocol, etc.). In an aspect, I/O applications 134 may be bus masters from traditional instruments or simple sensor I/O converters. Beneficially, I/O applications 134 permit any compute node 130 to be adapted to receive and transmit electrical signals between process control computing system 100 and process control elements. I/O applications 134 may be embodied as computer-executable instructions stored on a non-transitory computer-readable medium. In additional embodiments, I/O applications 134 are embodied as digital or analog electronic circuitry.

Referring again to FIG. 2, pump 138, sensor 140, and valves 142 are adapted for measuring physical changes in a process and/or physically manipulating portions of the process in order to achieve physical changes. For example, sensor 140 is configurable for measuring changes to the height of a fluid in a tank and reporting (e.g., transmitting data) the measurement to process control computing system 100. It is contemplated that other devices or instruments may be used for measurement purposes, including but not limited to, thermocouples, Coriolis flow tubes, radar emitters and receivers, and the like. Further, transducers and/or converters may be utilized to convert one type of signal into another type of signal (e.g., translate a mechanical signal into an electrical signal). Pump 138 and/or valve 142-A are utilized to, for example, restrict the flow of a fluid through piping in order to reduce the height of the fluid in a tank. It is to be understood by one skilled in the art that other devices may be used to cause physical changes, including but not limited to actuators, louvers, solenoids, and the like.

Figure 3A:
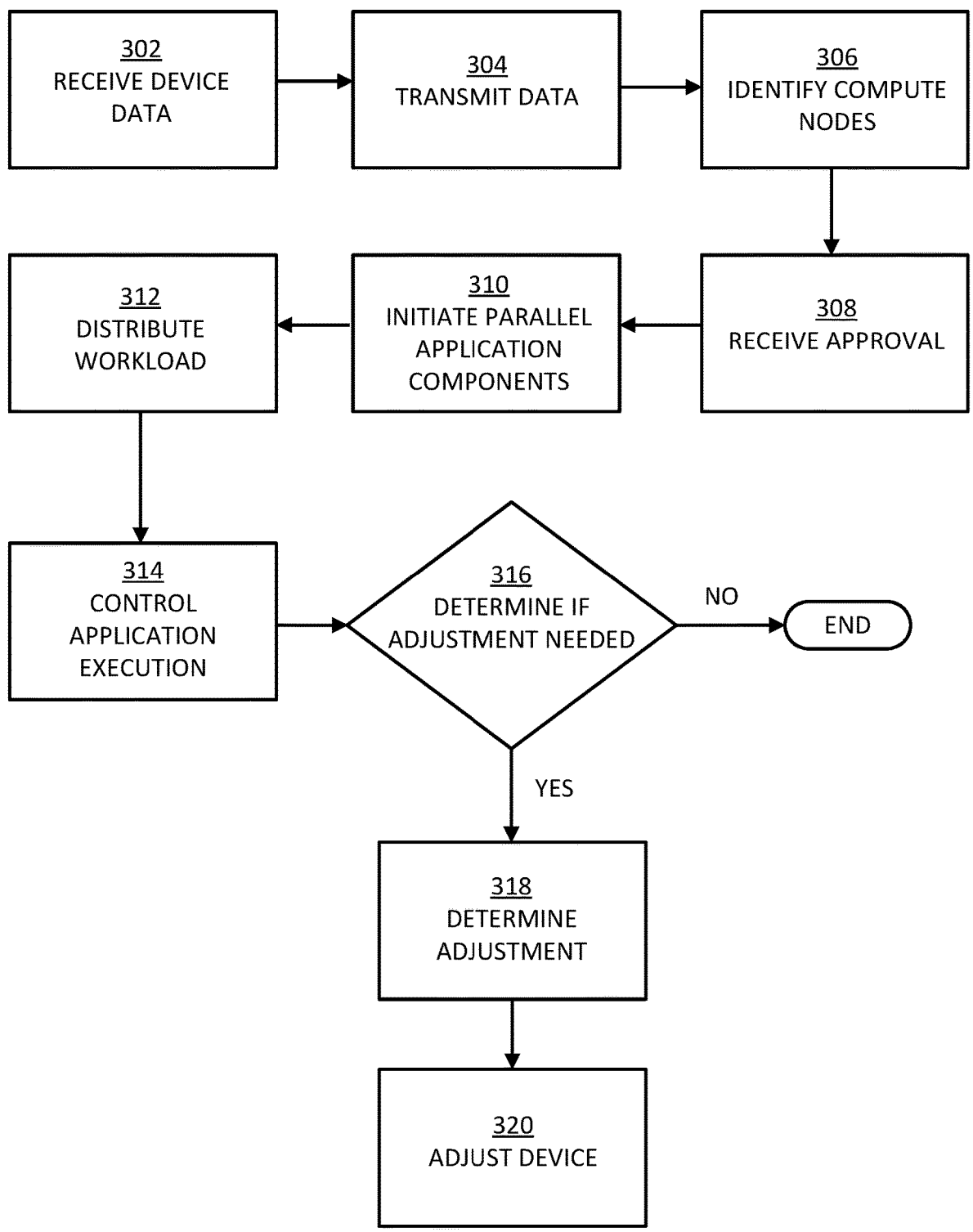
FIG. 3A is a flowchart of a stateless, event-driven application execution operation in accordance with an embodiment of the invention.

In accordance with an aspect of the present invention, process control computing system 100 provides stateless program execution. In an embodiment, stateless distributed computing is characterized by receiving requests to perform a function, which is then performed without information regarding previous requests (i.e., no "remembered" information). For example, executive services manager 112 is configurable to initiate and manage parallel activity, such as separate threads and/or processes, to perform an algorithmic operation. With reference to FIG. 3A, I/O application 134-B, executing on compute node 130-B, receives data at step 302. In an exemplary embodiment, the data represents values including a fluid height in a tank measured by sensor 140, an applied electrical voltage at pump 138, a position of valve 142-A that indicates a fluid flow rate into the tank, and a position of valve 142-B that indicates a fluid flow rate out of the tank. In an embodiment, FIG. 3A illustrates an event-driven application execution in which a result is based on a stimulus. At step 304, I/O application 134-B then transmits this data to executive services manager 112 and I/O database 116. In response, executive services manager 112 identifies and sends requests to idle compute nodes 130 during step 306. Compute nodes 130 that are idle and available for utilization send approval, which is received by executive services manager 112 at step 308.

Referring further to FIG. 3A, executive services manager 112 initiates control application 132-A on compute node 130-A and control application 132-D on compute node 130-D during step 310. For example, control applications 132-A and 132-D are stored on control database 114. Step 310 comprises, for example, executive services manager 112 facilitating the transmission of applications 132-A and 132-D from control database 114 to compute nodes 130-A and 130-D, respectively. Then at step 312, executive services manager 112 distributes the workload between control applications 132-A and 132-D. For example, executive services manager 112 facilitates the transmission of the data stored in I/O database 116, in whole or in part, to control application 132-A and/or control application 132-D. In this manner, executive services manager 112 functions as a manager that is responsible for identifying or initiating spare computing resources (e.g., identifying idle compute nodes 130 and/or and distributing the workload (e.g., control applications 132, I/O applications 134) among the nodes 130. It is to be understood by one skilled in the art that executive services manager 112 may distribute the workload in whole or in part.

At step 314 of FIG. 3A, control application 132-A calculates values, such as a change in volume of the fluid in the tank using the differential equation:

$$\frac{d}{dt} Vol = bV - a\sqrt{H},$$

where b is a constant related to the flow rate into the tank (e.g., data provided by valve 142-A), V is the voltage applied to pump 138 (e.g., data provided by pump 138), a is a constant related to the flow rate out of the tank (e.g., data provided by valve 142-B), and H is the height of fluid in the tank (e.g., data provided by sensor 140).

Control application 132-A transmits data representing the calculated change in volume to executive services manager 112, control database 114, and control application 132-D. At step 316, control application 132-D determines if a physical adjustment needs to be made to the process. For example, control application 132-D compares the value of the data received from control application 132-A to a setpoint. If the value satisfies the setpoint, then no action may be taken. But if the value fails to satisfy the setpoint, then control application 132-D proceeds to step 318 to determine adjustments to the process to be made by pump 138 (e.g., reduced or increased voltage) and valves 142-A and 142-B (e.g., increase or decrease fluid flow). In this manner, control applications 132-A and 132-D function as separate processes that perform an operation of a control algorithm using the data. Once adjustments are determined by application 132-D, they are transmitted to pump 138, and valves 142-A and 142-B via communication channel 120 and I/O applications 134-B and 134-F, as indicated by step 320.

Figure 3B:
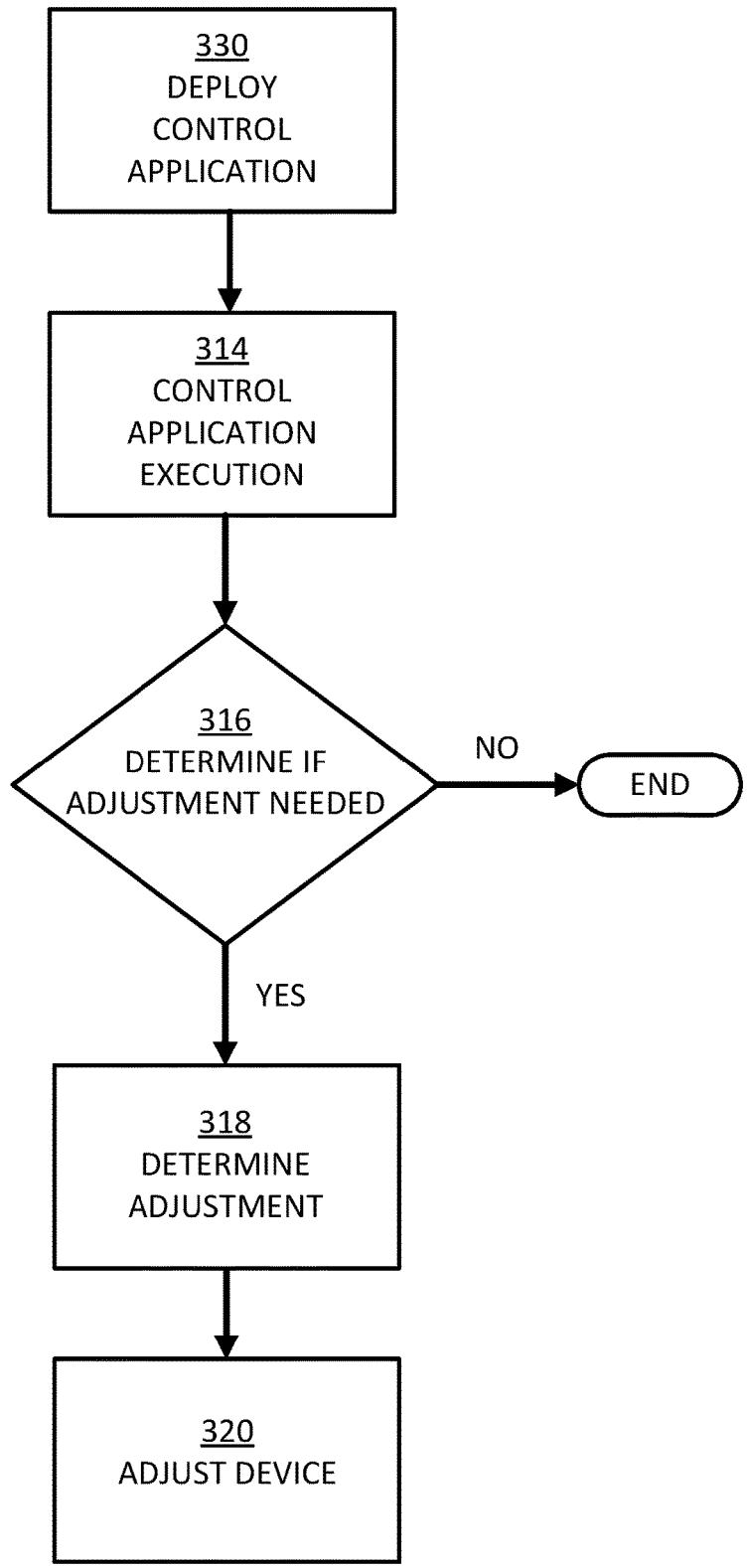
FIG. 3B is a flowchart of stateless, persistent application execution operation in accordance with an embodiment of the invention.

FIG. 3B illustrates an embodiment of persistent execution of control application 132-A. At step 330, control application 132-A is deployed to compute node 130-A, for example. In an embodiment, a user manually deploys control application 132-A. At step 314, control application 132-A stays resident on compute node 130-A and executes, as further described above. For example, control application 132-A reads data from control database 114 and/or I/O database 116, executes control algorithms, and writes data back to control database 114 and/or I/O database 116. In an embodiment, the execution illustrated by FIG. 3B proceeds to steps 316, 318, and 320, as further described above.

In another embodiment, process control computing system 100 provides stateless program execution in the form of a "classic" service model, such as one based on a service-oriented architecture (SOA). In yet another embodiment, process control computing system 100 is utilized with, for example, HyperText Markup Language (HTML) to provide web-based services (e.g., web farm).

FIG. 4A illustrates process control computing system 100 providing data migration and distribution in accordance with an embodiment of the invention. In this embodiment, process control computing system 100 includes executive node 110 and compute nodes 130-A and 130-B. Compute nodes 130-A and 130-B each include control application 132-A. A control application dataset 402 associated with control application 132-A is stored on compute nodes 130-A and 130-B and control database 114.

In an embodiment, the control application dataset 402 comprises data representing a current state and/or previous states and intermediate data of compute node 130-A. Beneficially, the embodiment of process control computing system 100 illustrated by FIG. 4A provides process control by copying and moving (i.e., transmitting) control application dataset 402, rather than requiring transmission of control application 132-A with its associated data. As indicated by the broken lines, and further described below, data that comprises control application dataset 402 is copied from compute node 130-A to control database 114 and then from control database 114 to compute node 130-B. This migration of state data enables process control computing system 100 to distribute execution load among compute nodes 130 (e.g., load balancing, addition of compute node 130) without management and initialization constraints of the prior art. It is to be understood by one skilled in the art that the embodiment of process control computing system 100 illustrated by FIG. 4A also provides data migration and distribution by using I/O applications 134 and I/O database 116.

In a further embodiment of FIG. 4A, process control computing system 100 provides redundancy in addition to and/or in lieu of providing data migration and distribution. For example, compute nodes 130-A and 130-B each execute control application 132-A and control application dataset 402 in parallel. Another compute node 130 and/or execute services manager 112 is then used to compare data between compute node 130-A and compute node 130-B to ensure each compute node is getting the same results. In an additional embodiment, any number of additional compute nodes 130 may be used to ensure compute nodes 130-A and 130-B are getting correct results, such as through voting, for example. In an embodiment, the additional compute nodes 130 may provide triple-modular redundancy (or greater redundancy) for safety and critical control applications.

Figure 4B:
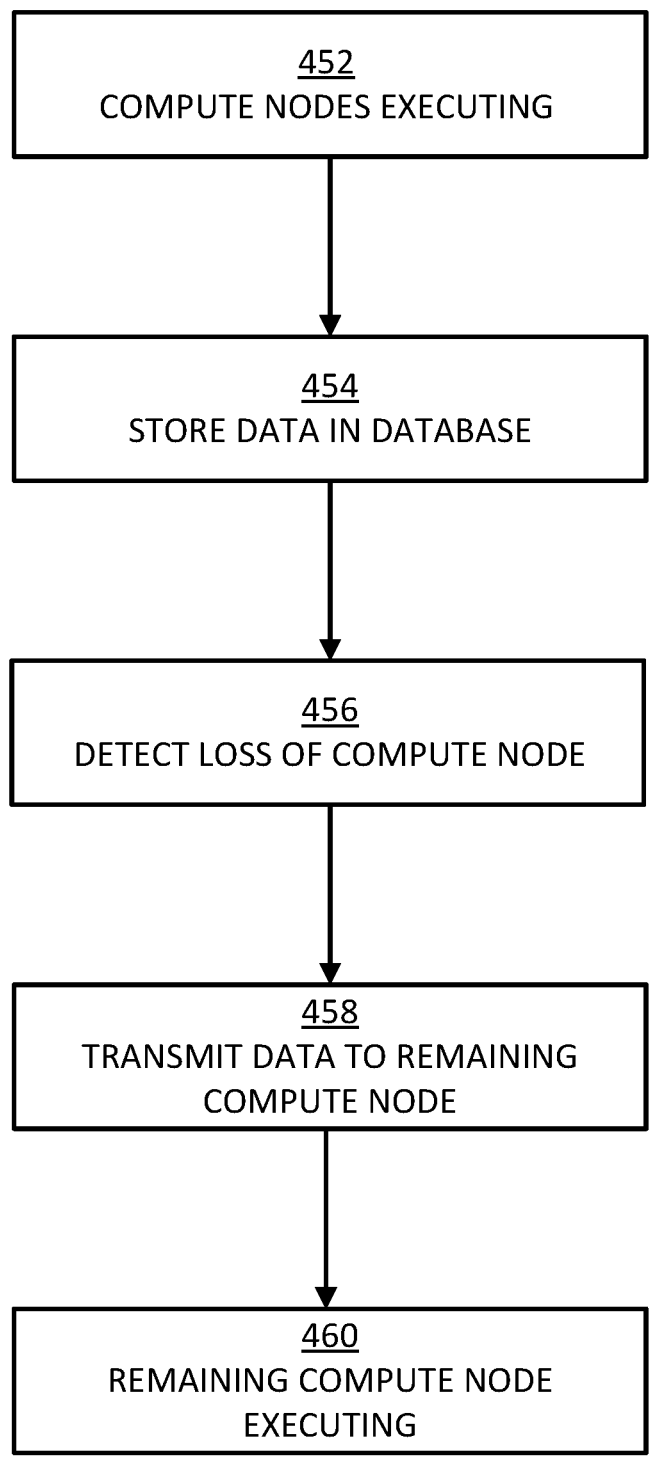
FIG. 4B is a flowchart of a data migration and distribution operation in accordance with an embodiment of the invention.

FIG. 4B illustrates a data migration and distribution operation of process control computing system 100. In operation of step 452, compute nodes 130-A and 130-B each execute control application 132-A. For example, control application 132-A executing on compute node 130-A is configurable to calculate values, such as a change in volume of a fluid in a tank, or execute an algorithmic operation, as discussed above. The execution of control application 132-A on compute node 130-A generates data that comprises control application dataset 402, such as state information for compute node 130-A or results of calculations. At step 454, the data of control application dataset 402 is stored in control database 114 by transmission from compute node 130-A via communication channel 120 and communication interface 118. The transmission of control application dataset 402 is regulated or supervised by executive services manager 112 in the illustrated embodiment.

Referring again to FIG. 4B, executive node 110 detects a loss (e.g., failure) of compute node 130-A during step 456. Upon this detection, operation continues to step 458 where executive services manager 112 initiates a transmission of control application dataset 402 from control database 114 to compute node 130-B, where control application 132-A is already executing. At step 460, compute node 130-B continues executing control application 132-A with control application dataset 402, including storing new and updated state data in control database 114. Advantageously, this data migration allows control to be moved from one compute node 130 to another in order to provide high availability and elasticity without the need for re-establishing connections. In alternative embodiments, process control computing system 100 operates under a data migration and distribution model without the loss of a compute node 130. For example, executive services manager 112 detects the addition of compute node 130-B and initiates the migration of control application dataset 402 from compute node 130-A to compute node 130-B while node 130-A is still executing control application 132-A. In this manner, process control computing system 100 can use data migration and distribution to handle the addition of compute nodes 130 or load balancing considerations. In another embodiment, the operation of FIG. 4B provides migration and distribution of I/O data with I/O applications 134 and I/O database 116.

Figure 5A:
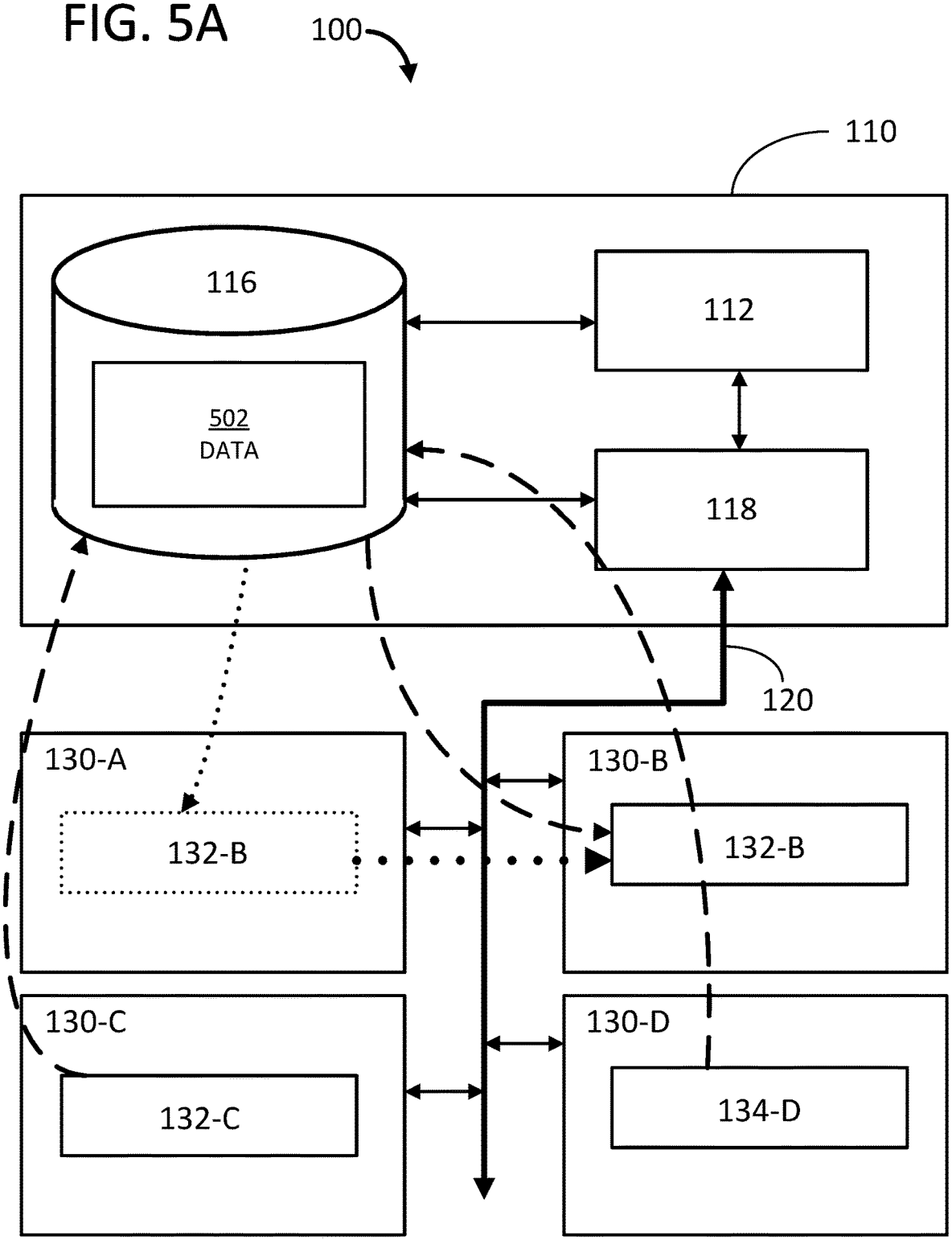
FIG. 5A is a diagram illustrating code migration and distribution of an exemplary architecture of hardware components in accordance with an embodiment of the invention.

FIG. 5A illustrates process control computing system 100 providing code migration and distribution in accordance with an embodiment of the invention. In this embodiment, process control computing system 100 includes executive node 110, communication channel 120, compute nodes 130-A, 130-B, 130-C, and 130-D, control applications 132-B and 132-C, and I/O application 134-D. In an embodiment, compute nodes 130 retain state information for utilizing prior information. I/O application 134-D is communicatively connected to input devices and adapted for receiving and transmitting electrical signals between process control computing system 100 and process control elements, such as pump 138, sensor 140, and valves 142 illustrated in FIG. 2. The data from these elements comprises an I/O application dataset 502. The data comprising I/O application dataset 502 also includes outputs from a PID block executing in control application 132-C.

Referring to FIG. 5A, the data comprising I/O application dataset 502 is transferred from I/O application 134-D to I/O database 116 and then made available to control application 132-B executing on compute node 130-B. Advantageously, control application 132-B can migrate from compute node 130-A to compute node 130-B without requiring the re-establishment of peer-to-peer connections between nodes 130. Instead, all of the required data is provided by the system 100 through I/O database 116. In an embodiment, executive node 110 detects a failure of compute node 130-A. Upon detection, executive services manager 112 transfers control application 132-B from failed compute node 130-A to compute node 130-B. The control database 114 and I/O database 116 associated with control application 132-B are each also moved to compute node 130-B.

Figure 5B:
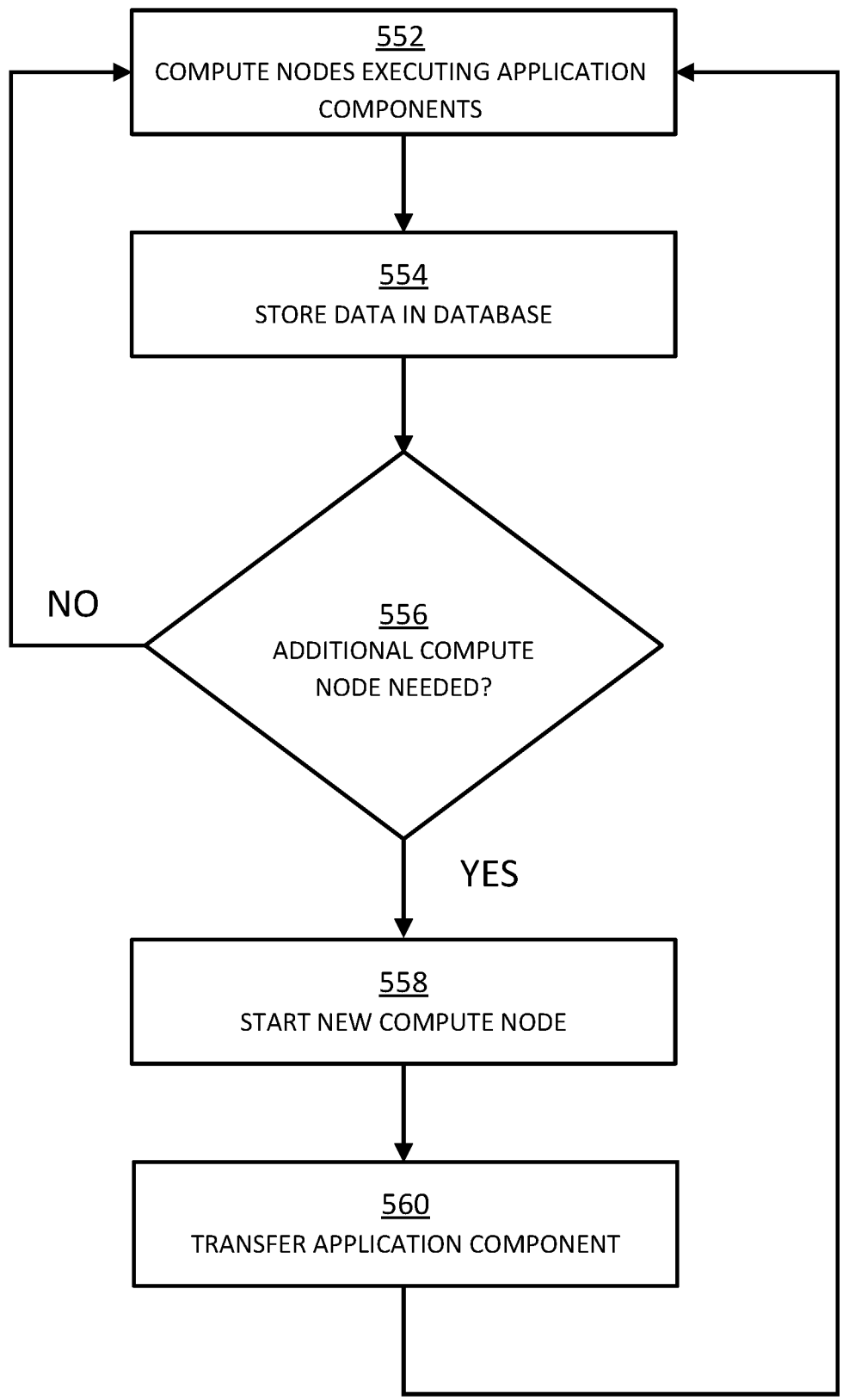
FIG. 5B is a flowchart of a code migration and distribution operation in accordance with an embodiment of the invention.

FIG. 5B illustrates a code migration and distribution of process control computing system 100. In operation of step 552, compute node 130-A executes control application 132-B, compute node 130-C executes control application 132-C, and compute node 130-D executes I/O application 134-D. For example, control application 132-C executing on node 130-C calculates values, such as a change in volume of a fluid in a tank, or executes an algorithmic operation, as discussed above. In an embodiment, I/O application 134-D provides a communicative connection between process control computing system 100 and sensor 140 and valve 142-A. It is contemplated that I/O application 134-D is configurable to provide a communicative connection to additional process control devices. The execution of control application 132-C and I/O application 134-D generates data that comprises I/O application dataset 502. For example, the data generated by control application 132-C is state information for compute node 130-C or results of calculations performed by control application 132-C. In an embodiment, the data generated by control application 132-C includes outputs from a PID block or the like executing on compute node 130-C or an external controller. The data generated by I/O application 134-D may be physical information about the height of a fluid in a tank measured by sensor 140, for example.

At step 554, the data from control application 132-C and I/O application 134-D is stored in I/O application dataset 502 on I/O database 116. For example, the data is transmitted from compute nodes 130-C and 130-D via communication channel 120 and communications interface 118. The executive services manager 112 preferably monitors, regulates, and/or supervises compute nodes 130. Also during step 554, control application 132-B executing on compute node 130-A receives data from I/O application dataset 502 and utilizes that data during execution. Control application 132-B in an embodiment calculates values, such as a change in volume of a fluid in a tank, or executes an algorithmic operation, as discussed above.

Referring again to FIG. 5B, executive services manager 112 determines at step 556 whether an additional compute node 130 is needed in order to provide adequate control of the process comprised of pump 138, sensor 140, and valves 142. For example, executive services manager 112 determines that an additional node 130-B is needed when a higher demand is being placed on node 130-A than it can meet. Executive services manager 112 in this embodiment also determines that additional node 130-B is needed when node 130-A is nearing or has entered a failure state. For example, a failure state may be a malfunction, in which case the entire control application 132-B is migrated to node 130-B. As a further example, a failure may also be an overload, in which case only a portion of control application 132-B is migrated to node 130-B. Executive services manager 112 is configurable to make the determination after receiving data representing a current or past state of compute node 130-A via communication channel 120 and communication interface 118. In a situation where executive services manager 112 determines that an additional compute node 130 is not required, the process returns to step 552 and continues. In a situation where executive services manager 112 determines that an additional compute node 130 is needed, the process continues to step 558.

At step 558, executive services manager 112 identifies a compute node 130 with excess capacity to run additional computations, which provides load-balancing in an embodiment. For example, compute node 130-B is connected to communication channel 120, but not executing a control application 132 or an I/O application 134. In such a situation, executive services manager 112 identifies compute node 130-B as being idle and starts a new application (e.g., control application 132, I/O application 134, etc.) in compute node 130-B. In another embodiment, executive services manager 112 identifies compute node 130-B as not idle (i.e., executing a control application 132 and/or an I/O application 134), but having sufficient spare resources to handle execution of control application 132-B. After executive services manager 112 identifies a suitable compute node 130, the process proceeds to step 560 where an application is transferred to the idle node. For example, executive services manager 112 initiates a transfer of control application 132-B from compute node 130-A to compute node 130-B. After the transfer, the process returns to step 552, where control application 132-B executes on compute node 130-B, receives data from I/O application dataset 502, and utilizes that data during execution.

In an embodiment, process control computing system 100 segments data sources (e.g., I/O application dataset 502) for code migration and distribution operations through various decomposition techniques, such as task decomposition, data decomposition, data flow decomposition, and the like. In another embodiment, process control computing system 100 coordinates compute nodes 130 to manage the data being used through synchronization primitives, such as semaphores, locks, condition variables, and the like.

FIG. 6 illustrates various implementations of I/O applications 134 that can be supported by process control computing system 100. In an embodiment, process control computing system 100 provides support for classic I/O devices, such as a HART modem 610 that provides a communicative connection with pump 138 via the HART communications protocol. In this embodiment, I/O application 134-B functions as a HART master executing on compute node 130-B. In another embodiment, process control computing system 100 provides support for simple sensor I/O models, such as a simple sensor 620 that provides a communicative connection with sensor 140 and valves 142. Simple sensors are used to gather raw data relating to process variables, such as temperature, pressure, and flow rate. A separate processor (i.e., a sensor brain) processes the raw data into a form that can be used within the process control system. Commonly assigned U.S. patent application Ser. No. 14/171,344, which describes a sensor brain for simple sensors, is incorporated by reference in its entirety.

In this embodiment, I/O application 134-D executes as a simple sensor paid algorithm on compute node 130-D and I/O application 134-F executes as a simple sensor free algorithm on compute node 130-F. In an embodiment, I/O applications 134 and compute nodes 130 allow process control computing system 100 to interface with process control devices (e.g., pump 138, sensor 140, valves 142) via a variety of communication protocols. Beneficially, this interoperability improves the functioning of process control computing system 100.

Figure 7:
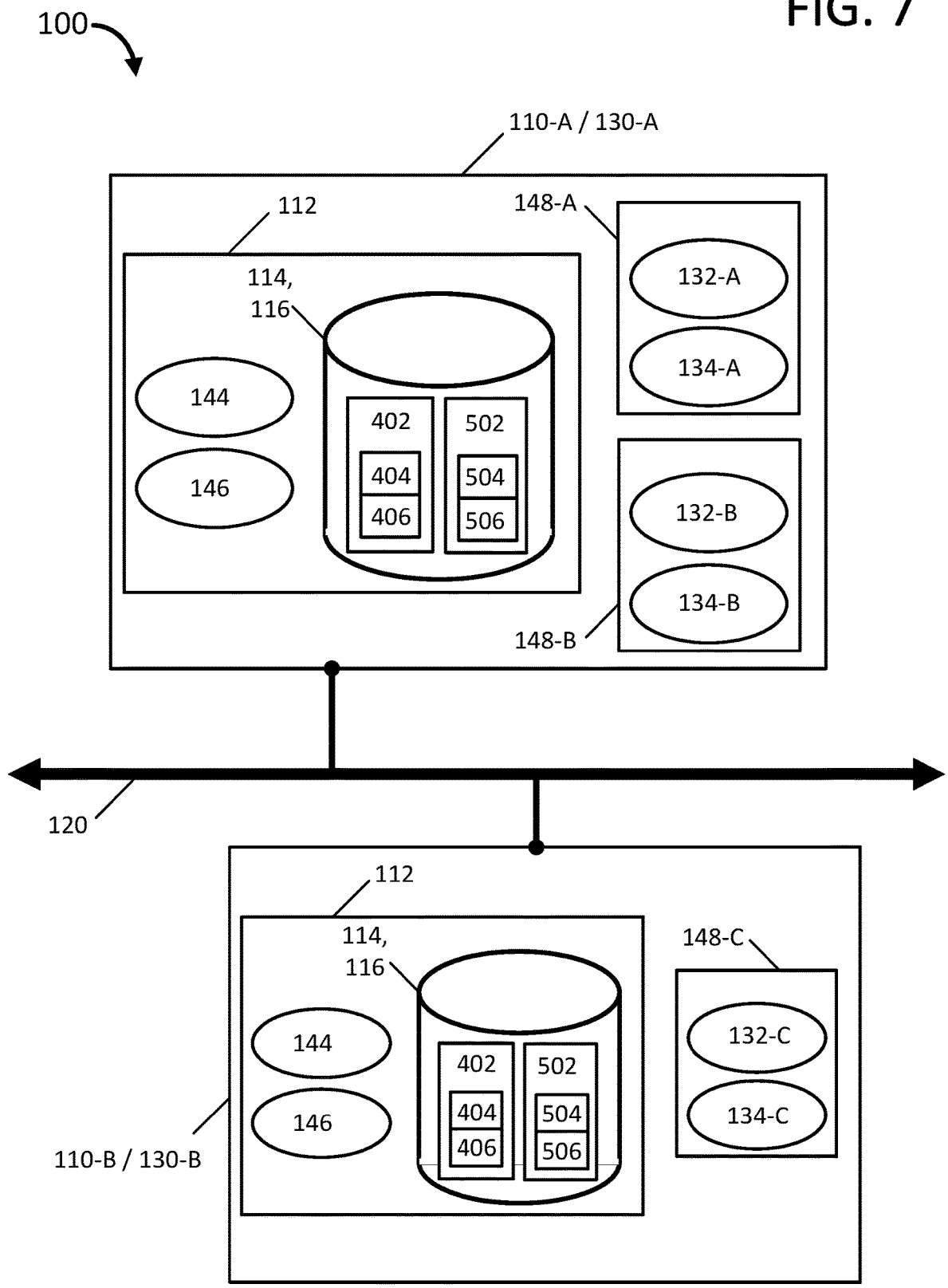
FIG. 7 is a diagram of an exemplary architecture of hardware components in accordance with an embodiment of the invention.

FIG. 7 illustrates another exemplary embodiment of process control computing system 100 in which executive services manager 112 and computational engines 148 reside within the same node. This embodiment includes two nodes, 110-A/130-A and 110-B/130-B, that are each configurable for simultaneously functioning as executive node 110 and compute node 130. Each node includes executive services manager 112 and is communicatively connected to communication channel 120. Node 110-A/130-A includes computational engines 148-A and 148-B and node 110-B/130-B includes computational engine 148-C. The executive services manager 112 includes application manager 144, computational engine manager 146, and a database that functions as control database 114 and I/O database 116. The database further includes control application dataset 402 and I/O application dataset 502. The control application dataset 402 is comprised of control configuration data 404 and control dynamic data and I/O application dataset 502 is comprised of I/O configuration data 504 and I/O dynamic data 506. The computational engines 148-A, 148-B, and 148-C each include control applications 132-A, 132-B, and 132-C and I/O applications 134-A, 134-B, and 134-C, respectively. In an embodiment, each computational engine 148 is a virtual machine (VM).

The embodiment of FIG. 7 exemplifies a small system 100 that provides high availability using the two nodes 110-A/130-A and 110-B/130-B. In this exemplary embodiment, executive services manager 112 is duplicated, but active on only one node at a time. For instance, executive services manager 112 may at first be active on node 110-A/130-A and manage computational engines 148-A, 148-B, and 148-C. Then in case of a failure associated with node 110-A/130-A, executive services manager 112 becomes active on node 110-B/130-B due to spare resources available on node 110-B/130-B. It is to be understood by one skilled in the art that node 110-B/130-B does not need to be initially designated as a backup to node 110-A/130-A. For example, the spare resources on node 110-B/130-B may be used for additional computational engines 148. However, when the exemplary embodiment of system 100 detects a failure, the spare resources on node 110-B/130-B are used for executive services manager 112.

Figure 8:
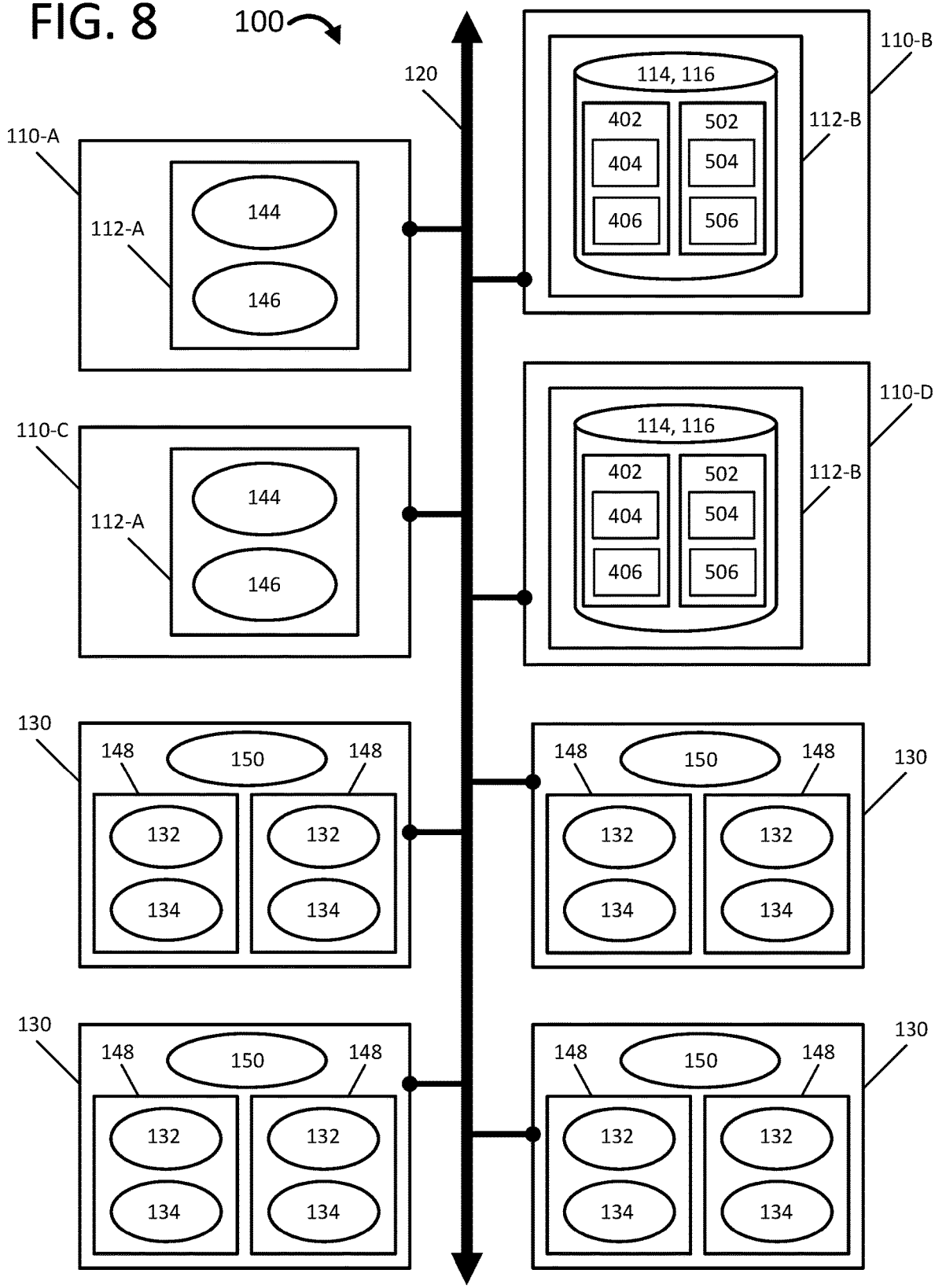
FIG. 8 is a diagram of an exemplary architecture of hardware components in accordance with an embodiment of the invention.

FIG. 8 illustrates another exemplary embodiment of process control computing system 100 in which executive services manager 112 and computational engines 148 execute on separate nodes. In the exemplary embodiment, executive services manager 112 executes on executive nodes 110 and computational engines 148 execute on compute nodes 130. In this embodiment, executive services manager 112 is separated into multiple nodes (i.e., distributed executive services) to manage high demand on the services, for example. Executive node 110-A includes a portion, 112-A, of executive services manager 112, which in turn includes application manager 144 and computational engine manager 146. Executive node 110-B includes another portion, 112-B, of executive services manager 112, which in turn includes control database 114, I/O database 116, control application dataset 402, control configuration data 404, control dynamic data 406, I/O application dataset 502, I/O configuration data 504, and I/O dynamic data 506. Executive nodes 110 and compute nodes 130 are communicatively connected to communication channel 120. In an embodiment, portions 112-A and 112-B of executive services manager 112 function together as a central data repository for all data of system 100.

The embodiment of system 100 illustrated by FIG. 8 also includes a plurality of computational engines 148 executing on a plurality of compute nodes 130. The computational engines 148 each include control application 132 and I/O application 134. The compute nodes 130 also each include a compute services manager 150. In an embodiment, the compute services manager 150 interacts with executive services manager 112 and/or portions thereof (e.g., portions 112-A and 112-B) to manage computational engines 148. In this exemplary embodiment, portions of executive services manager 112-A and 112-B are each duplicated for high availability but active on only one node at a time. For instance, portion 112-A may at first be active on node 110-A and portion 112-B may be active on node 110-B. Then in case of a failure associated with node 110-A, portion 112-A becomes active on node 110-C due to spare resources available on node 110-C. In case of a failure associated with node 110-B, portion 112-B becomes active on node 110-D. In an embodiment, executive services manager 112 and/or portions thereof provides a central data store as a distribution mechanism for data that does not suffer from negative consequences of inherent bottlenecks. For instance, the central data store provides data that is readily available to every node without negative impacts on applications (e.g., control application 132) or other process control hardware (e.g., Fieldbus modules).

With continued reference to the exemplary embodiment of FIG. 8, if a computational engine 148 fails, all functionality provided by that engine is moved to an alternate computational engine through one of multiple recovery scenarios. In one embodiment, functional migration is accomplished by moving (e.g., through transmission and reception of data via communication channel 120) applications (e.g., control application 132 and/or I/O application 134) to a different computational engine 148. For example, executive services manager 112 monitors the health of a computational engine 148 in the form of a virtual machine on a first node. In the case of a failure of that first node, executive services manager 112 initiates (e.g., spins up) a new virtual machine (e.g., computational engine 148) on another node. In another embodiment, functional migration is accomplished by re-assignment of the run-time data, including internal state information, of an application to an equivalent application running in a different computational engine 148. In yet another embodiment, a combination of both approaches described above is utilized. In a further embodiment, all applications of a certain computational engine 148 are migrated to another node (e.g., compute node 130 and/or executive node 110). In this manner, FIG. 8 illustrates an embodiment of system 100 that is scalable because the distributed control is comprised of applications that are configurable for executing on any available hardware (e.g., compute nodes 130 and/or executive nodes 110). Additionally, FIG. 8 also illustrates an embodiment of system 100 that provides rapid failover, with the failover mode based upon the type of application a computational engine 148 is running.

Figure 9:
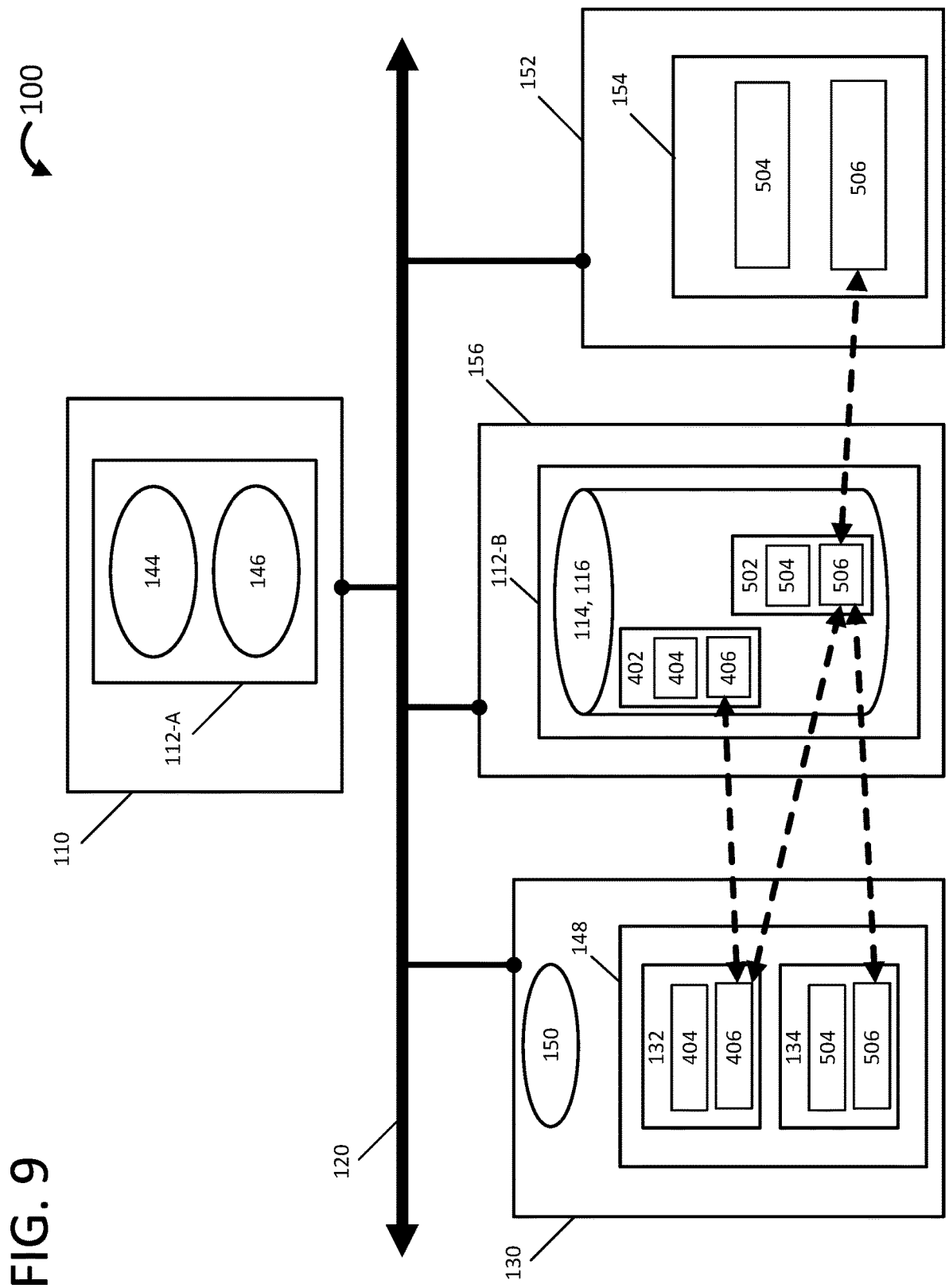
FIG. 9 is a diagram of an exemplary architecture of hardware components in accordance with an embodiment of the invention.

FIG. 9 illustrates an exemplary embodiment of process control computing system 100 including executive node 110, compute node 130, an I/O node 152, and a central storage node 156. Executive node 110 includes a portion, 112-A, of executive services manager 112. This portion 112-A further includes application manager 144 and computational engine manager 146. Compute node 130 includes computational engine 148 and compute services manager 150. Computational engine 148 further includes control application 132 and I/O application 134. Control application 132 includes control configuration data 404 and control dynamic data 406. I/O application 134 includes I/O configuration data 504 and I/O dynamic data 506. The I/O node 152 includes an I/O source dataset 154 which in turn comprises I/O configuration data 504 and I/O dynamic data 506. The central storage node 156 includes another portion, 112-B, of executive services manager 112. In this manner, executive services manager 112 is distributed among executive node 110 and central storage node 156. The portion 112-B further includes control database 114 and I/O database 116, which in turn further includes control application dataset 402, control configuration data 404, control dynamic data 406, I/O application dataset 502, I/O configuration data 504, and I/O dynamic data 506.

In this exemplary embodiment of FIG. 9, all of the nodes of system 100 use a common Ethernet network (e.g., communication channel 120) to exchange data through the central storage node 156. In one embodiment, each node resides on a separate physical computing device. In another embodiment, any combination of nodes resides on the same physical computing device. For instance, portion 112-A of executive services manager 112 may reside on compute node 130. As another example, portion 112-B of executive services manager 112 may reside on executive node 110. In an embodiment, computational engine 148 executes a number of applications in addition to control application 132 and I/O application 134. Additional applications may contain logic, objects, configuration data, and dynamic data, for example. In an embodiment, an application is any piece of computer-executable code that performs a function (e.g., ksh, LINUX® executable, WINDOWS® EXE, PYTHON™, etc.). In another embodiment, an application is deployable as a separate executable independent of other executables. In yet another embodiment, all functionality for system 100, other than infrastructure functionality, is provided as an application (e.g., control, I/O scanning, historization, gateway type functionality, etc.). In another exemplary embodiment, one or more computational engines 148 may run on each compute node 130.

In the exemplary embodiment of FIG. 9, I/O node 152 has an external interface to collect (i.e., receive) input data or transmit output data. For example, I/O node 152 accomplishes data reception and transmission with various process components (e.g., pump 138, sensor 140, valves 142, etc.) via communication channel 120. In an embodiment, this data is stored in central storage node 156 to allow all nodes to access it. In the embodiment of FIG. 9, I/O node 152 is configurable to receive Ethernet-based data from process components and transmit the data to central storage node 156. Applications using I/O (e.g., I/O application 134 executing on compute node 130) are configurable to retrieve the data from central storage node 156. In an embodiment, any dedicated I/O interfaces are in boxes external to system 100 and I/O source dataset 154 is configurable for migrating to another node if I/O node 152 fails.

With further respect to the embodiment of FIG. 9, central storage node 156 contains run-time data associated with system 100. In an embodiment, access to this run-time data, computed values, and I/O data is available to all applications (e.g., control application 132 and/or I/O application 134) directly via central storage node 156. In this exemplary manner, central storage node 156 functions as a central data store or a central data repository. It is to be understood by one skilled in the art that the applications do not necessarily need to continuously exchange all of the run-time data with the central data store, but are not precluded from doing so. In another embodiment, data of system 100 is exchanged through central storage node 156 rather than peer-to-peer among the other nodes. The dashed lines of FIG. 9 illustrate the movement of data in system 100 with central storage node 156 providing a central data store.

Referring again to the exemplary embodiment of FIG. 9, executive services manager 112 and/or portions thereof (e.g., portions 112-A and 112-B) provides management of computational engine 148, control application 132, I/O application 134, and central storage node 156. In this embodiment, functional services of executive services manager 112 include, but are not limited to, management of computational engine images (e.g., computational engine 148), launching of computational image instances, monitoring health of computational engines, management of computational engine failures, maintaining a central data repository (e.g., central storage node 156), and additional maintenance of the overall local cloud and network. In an embodiment, executive services manager 112 is distributed among multiple nodes for high availability and scalability. In addition, executive services manager 112 may reside in a physical computer that is executing computational engine 148. In this manner, there is no requirement for dedicated servers to support executive services manager 112 and a small system 100 without high availability can be on one physical computing device.

According to aspects of the present invention, process control computing system 100 provides stateless program execution, data migration and distribution, and code migration and distribution capabilities through the availability of shared data. For example, distributed compute nodes 130, each executing control applications 132 and/or I/O applications 134, manage an object state of an industrial process through shared data (e.g., control application dataset 402, I/O application dataset 502). In an aspect where process control computing system 100 is provided in a control system environment, such as illustrated by FIG. 2 and FIG. 6, sharing data entails the distribution of I/O applications 134 to multiple compute nodes 130 as well as the distribution of control data and state (e.g., data in control application dataset 402) from one compute node 130 to another for high availability.

In one embodiment, process control computing system 100 utilizes time-sharing techniques to avoid worst case computing resource ownership. For example, a control application 132-A executes on compute node 130-A during a first time period and a different control application 132-B executes on compute node 130-A during a second time period that does not overlap with the first time period. Such time sharing shifts demand among various compute nodes 130 and provides elasticity for process control computing system 100.

In another embodiment, compute nodes 130 function as single-loop controllers. In a further embodiment, multiple compute nodes 130 functioning as single-loop controllers are combined into a cluster. According to additional aspects of the present invention, process control computing system 100 provides tight synchronization across all compute nodes 130 with immediate data publications to control database 114 and/or I/O database 116 (e.g., control application dataset 402, I/O application dataset 502). In an embodiment, a tight field network synchronization controls when applications (e.g., control applications 132, I/O applications 134) execute in different compute nodes 130 and when data is published to control database 114 and/or I/O database 116. In a further embodiment, network delays are taken into account and gaps are scheduled in an overall control cycle. Moreover, such a macrocycle may be partially automated, as in the Foundation Fieldbus model for example.

In yet another embodiment, process control computing system 100 defines migratable control elements (e.g., control applications 132) that are an entire loop. When control is migrated between compute nodes 130 (e.g., from node 130-A to node 130-B), primary control blocks are kept together as a group. For example, an entire control application 132 is configurable to be migrated as a complete unit.

In a further embodiment, process control computing system 100 provides continuous process control. Executive node 110 detects an addition of one or more compute nodes 130 via communication channel 120. Upon this detection, executive node 110 allocates, via communication channel 120, a control application 132 among the added compute node 130 and pre-existing compute nodes 130. After allocation, the control application 132 generates electronic data that is utilized by process control computing system 100 to control a process that changes or refines raw materials to create end products (e.g., processes in the chemical, oil and gas, food and beverage, pharmaceutical, water treatment, and power industries).

In a further embodiment, control applications 132 are algorithms that compensate for the fragmentation of complex loops across multiple compute nodes 130. In yet another embodiment, the sampling and execution times of control applications 132 and I/O applications 134 are increased to allow the control cycle to complete within the process frequency, which eliminates deadtime. In alternative embodiments, spare compute nodes 130 are virtualized elements within a controller. This virtualization would allow a virtual server to provide spare capacity for multiple compute nodes 130.

According to additional aspects of the present invention, process control computing system 100 provides high availability in a process control system. In an embodiment, executive node 110 includes executive services manager 112 and control database 114. A compute node 130-A stores a current state electronic dataset and an intermediate operation electronic dataset in control database 114 via communication channel 120, which is connected to compute node 130-A and executive node 110. Executive services manager 112 detects a failure of compute node 130-A and initiates the copying of the current state electronic dataset and the intermediate operation electronic dataset from control database 114 to a compute node 130-B via communication channel 120. The compute node 130-B transforms the current state electronic dataset and the intermediate operation electronic dataset into a process control electronic dataset and then transmits the process control electronic dataset to a process control device, which manipulates a process accordingly.

Moreover, process control computing system 100 may reduce deadtime in distributed computing environments according to additional embodiments. For example, executive node 110 may sample and execute a process control cycle within a first time period. A process may then be operated within a second time period, where the first time period is concurrent with the second time period and where the first time period is shorter than the second time period.

Embodiments of the present invention may comprise a special purpose computer including a variety of computer hardware, as described in greater detail below.

Embodiments within the scope of the present invention also include computer-readable media for carrying or having computer-executable instructions or data structures stored thereon. Such computer-readable media can be any available media that can be accessed by a special purpose computer. By way of example, and not limitation, such computer-readable media can comprise RAM, ROM, EEPROM, CD-ROM or other optical disk storage, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which aspects of the invention may be implemented. Although not required, aspects of the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the invention may be practiced in network computing environments with many types of computer system configurations, including personal computers, hand-held devices, multiprocessor systems, microprocessor-based or programmable consumer electronics, network PCs, minicomputers, mainframe computers, and the like. Aspects of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing aspects of the invention includes a general purpose computing device in the form of a conventional computer, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory includes read only memory (ROM) and random access memory (RAM). A basic input/output system (BIOS), containing the basic routines that help transfer information between elements within the computer, such as during start-up, may be stored in ROM. Further, the computer may include any device (e.g., computer, laptop, tablet, PDA, cell phone, mobile phone, a smart television, and the like) that is capable of receiving or transmitting an IP address wirelessly to or from the internet.

The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein employs a magnetic hard disk, a removable magnetic disk, and a removable optical disk, other types of computer readable media for storing data can be used, including magnetic cassettes, flash memory cards, digital video disks, Bernoulli cartridges, RAMs, ROMs, solid state drives (SSDs), and the like.

The computer typically includes a variety of computer readable media. Computer readable media can be any available media that can be accessed by the computer and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media are non-transitory and include, but are not limited to, RAM, ROM, EEPROM, flash memory or other memory technology, CD-ROM, digital versatile disks (DVD) or other optical disk storage, SSDs, magnetic cassettes, magnetic tape, magnetic disk storage or other magnetic storage devices, or any other medium which can be used to store the desired non-transitory information, which can accessed by the computer. Alternatively, communication media typically embody computer readable instructions, data structures, program modules or other data in a modulated data signal such as a carrier wave or other transport mechanism and includes any information delivery media.

Program code means comprising one or more program modules may be stored on the hard disk, magnetic disk, optical disk, ROM, and/or RAM, including an operating system, one or more application programs, other program modules, and program data. A user may enter commands and information into the computer through a keyboard, pointing device, or other input device, such as a microphone, joy stick, game pad, satellite dish, scanner, or the like. These and other input devices are often connected to the processing unit through a serial port interface coupled to the system bus. Alternatively, the input devices may be connected by other interfaces, such as a parallel port, a game port, or a universal serial bus (USB). A monitor or another display device is also connected to the system bus via an interface, such as video adapter 48. In addition to the monitor, personal computers typically include other peripheral output devices (not shown), such as speakers and printers.

One or more aspects of the invention may be embodied in computer-executable instructions (i.e., software), routines, or functions stored in system memory or nonvolatile memory as application programs, program modules, and/or program data. The software may alternatively be stored remotely, such as on a remote computer with remote application programs. Generally, program modules include routines, programs, objects, components, data structures, etc. that perform particular tasks or implement particular abstract data types when executed by a processor in a computer or other device. The computer executable instructions may be stored on one or more tangible, non-transitory computer readable media (e.g., hard disk, optical disk, removable storage media, solid state memory, RAM, etc.) and executed by one or more processors or other devices. As will be appreciated by one of skill in the art, the functionality of the program modules may be combined or distributed as desired in various embodiments. In addition, the functionality may be embodied in whole or in part in firmware or hardware equivalents such as integrated circuits, application specific integrated circuits, field programmable gate arrays (FPGA), and the like.

The computer may operate in a networked environment using logical connections to one or more remote computers. The remote computers may each be another personal computer, a tablet, a PDA, a server, a router, a network PC, a peer device, or other common network node, and typically include many or all of the elements described above relative to the computer. The logical connections include a local area network (LAN) and a wide area network (WAN) that are presented here by way of example and not limitation. Such networking environments are commonplace in office-wide or enterprise-wide computer networks, intranets and the Internet.

When used in a LAN networking environment, the computer is connected to the local network through a network interface or adapter. When used in a WAN networking environment, the computer may include a modem, a wireless link, or other means for establishing communications over the wide area network, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing communications over wide area network may be used.

Preferably, computer-executable instructions are stored in a memory, such as the hard disk drive, and executed by the computer. Advantageously, the computer processor has the capability to perform all operations (e.g., execute computer-executable instructions) in real-time.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. An apparatus for controlling a process, comprising:
    an electronic data communication channel;
    a plurality of compute nodes each connected to the communication channel and storing control datasets associated therewith, wherein a first compute node of the plurality of compute nodes implements a process control application; and
    an executive node connected to the communication channel, the executive node including an application manager configured to:
        detect a failure of the first compute node;
        deploy, from the executive node in response to the detected failure, an input/output (I/O) or other application of the failed first compute node to a second compute node of the plurality of compute nodes, wherein the second compute node does not establish a peer-to-peer connection with the failed first compute node;
        receive one or more selected subsets of control datasets from the failed first compute node and transmit the selected subsets to the second compute node; and
        instruct the second compute node to execute the selected subsets of the control datasets at the I/O or other application deployed to the second compute node, the selected subsets being associated with the failed first compute node and comprising less than entire control datasets of the plurality of compute nodes.

2. The apparatus of claim 1, wherein the first compute node implementing the process control application is configured to store a current state and intermediate data associated with the process control application in a control database of the executive node, and wherein the executive node is further configured to initiate a transfer of the current state and the intermediate data from the control database to the second compute node in response to the detected failure.

3. The apparatus of claim 1, wherein the application manager of the executive node is configured to store, at a central datastore hosted at the executive node, the I/O or other application and the control datasets.

4. The apparatus of claim 1, wherein the control datasets are collected, in real-time, from the plurality of compute nodes.

5. The apparatus of claim 1, wherein the application manager is further configured to select the subsets of control datasets.

6. The apparatus of claim 1, further comprising:
a sensor connected to the communication channel for providing electronic data representative of a physical value of the process; and
an actuator connected to the communication channel for receiving electronic data representative of a manipulation of the physical value of the process;
wherein the I/O or other application is configured to control electronic data transmission and reception between the communication channel and the sensor and the actuator.

7. The apparatus of claim 1, wherein the selected subsets are used to mitigate an impact of the failed compute node on a process control system.

8. The apparatus of claim 1, wherein the process control application is configured to transmit the control datasets via the communication channel and the I/O or other application to a process control device.

9. The apparatus of claim 1, wherein the executive node includes a set of executive services, the set of executive services being used to facilitate an exchange of the I/O or other application and the control datasets between the I/O or other application and the process control application.

10. The apparatus of claim 1, wherein the first compute node and the executive node comprise a controller of a process control system.

11. The apparatus of claim 1, wherein the executive node is configured to detect at least one idle compute node and initiates a transfer of at least a subset of the process control application to the idle compute node.

12. The apparatus of claim 1, wherein the compute nodes comprise a distributed computing environment.

13. A method for controlling a process, comprising:
implementing, by a first compute node of a plurality of compute nodes, a process control application, wherein the compute nodes store control datasets associated therewith and are connected to an electronic data communication channel;
detecting, by an application manager of an executive node, a failure of the first compute node, wherein the executive node is connected to the communication channel;
deploying, by the application manager of the executive node in response to the detected failure, an input/output (I/O) or other application of the failed first compute node to a second compute node of the compute nodes, wherein the second compute node does not establish a peer-to-peer connection with the failed first compute node;
receiving one or more selected subsets of control datasets from the failed first compute node;
transmitting the selected subsets to the second compute node; and
instructing, by the application manager of the executive node, the second compute node to execute the selected subsets of the control datasets at the I/O or other application deployed to the second compute node, wherein the selected subsets are associated with the failed first compute node and comprise less than entire control datasets.

14. The method of claim 13, further comprising:
storing, by the first compute node, a current state and intermediate data associated with the process control application in a control database of the executive node; and
initiating, by the application manager of the executive node, a transfer of the current state and the intermediate data from the control database to the second compute node in response to the detected failure.

15. The method of claim 13, further comprising storing, by the application manager of the executive node, the I/O or other application and the control datasets at a central datastore hosted at the executive node.

16. The method of claim 13, further comprising selecting, by the application manager of the executive node, the subsets of control datasets.

17. The method of claim 13, further comprising:
providing, by a sensor connected to the communication channel, electronic data representative of a physical value of the process; and
receiving, by an actuator connected to the communication channel, electronic data representative of a manipulation of the physical value of the process; and
controlling, by the I/O or other application, electronic data transmission and reception between the communication channel and the sensor and the actuator.

18. The method of claim 13, transmitting, by the process control application to a process control device, the control datasets via the communication channel and the I/O or other application.

19. The method of claim 1, wherein the executive node includes a set of executive services, and further comprising facilitating, by the executive services, an exchange of the I/O or other application and the control datasets between the I/O or other application and the process control application.

20. The method of claim 13, further comprising detecting, by the application manager of the executive node, at least one idle compute node and initiating a transfer of at least a subset of the process control application to the idle compute node.

* * * * *